United States Patent [19]

Fukuda et al.

[11] Patent Number: 4,952,159
[45] Date of Patent: Aug. 28, 1990

[54] CHAMFERING MACHINE

[75] Inventors: Kenji Fukuda; Yasuo Kazama, both of Tokyo, Japan

[73] Assignee: Nitto Kohki Co., Ltd., Tokyo, Japan

[21] Appl. No.: 432,353

[22] Filed: Nov. 6, 1989

Related U.S. Application Data

[63] Continuation of Ser. No. 290,366, Dec. 29, 1988, abandoned.

[30] Foreign Application Priority Data

Jan. 14, 1988 [JP] Japan ............................. 63-3640[U]

[51] Int. Cl.$^5$ ............................................. B23C 3/12
[52] U.S. Cl. ............................. 409/138; 144/134 D; 409/178; 409/181; 409/204; 409/214
[58] Field of Search ............... 409/137, 138, 139, 140, 409/175, 178, 181, 182, 204, 210, 214, 218; 144/134 D, 134 E, 136 C

[56] References Cited

U.S. PATENT DOCUMENTS

| | | | |
|---|---|---|---|
| 2,856,975 | 10/1958 | Addis | 144/134 D |
| 3,125,934 | 3/1964 | Persson | 409/138 |
| 3,162,221 | 12/1964 | Lacey | 409/182 |
| 3,212,541 | 10/1965 | Burrows et al. | 144/134 D |
| 3,517,712 | 6/1970 | Selowitz | 409/138 |
| 3,628,579 | 12/1971 | Roche | 409/178 |

FOREIGN PATENT DOCUMENTS

| | | | |
|---|---|---|---|
| 2719979 | 11/1978 | Fed. Rep. of Germany | 409/178 |
| 2949656 | 6/1981 | Fed. Rep. of Germany | |
| 3237276A1 | 5/1983 | Fed. Rep. of Germany | |
| 62-100814 | 6/1987 | Japan | |

*Primary Examiner*—Daniel W. Howell
*Attorney, Agent, or Firm*—Nixon & Vanderhye

[57] ABSTRACT

A machine for chamfering the corner of an object comprising a rotating cutter arranged in a machine body and having cutting blades around the outer circumference of that portion of the rotating cutter which is projected from and tilted relative to an underside, a slide guide for slidably supporting the underside of the machine body and having guide planes perpendicular to each other and slidable along the corner of the object and also having a space formed between the planes and into which at least a part of the cutting blades of the rotating cutter is projected, a fixing means for connecting the machine body and the slide guide releasably from each other to adjust the cutting blades projected into the space between the guide planes of slide guide, and a stud means having a first end fixed to one of the machine body and slide guide at a position remote from the rotating cutter and serving to make the machine body and the slide guide swingable to each other when the fixing means is under release.

8 Claims, 3 Drawing Sheets

CHAMFERING MACHINE

This is a continuation of application Ser. No. 290,366, filed Dec. 29, 1988, now abandoned.

BACKGROUND OF THE INVENTION

1. Field of the Invention

The present invention relates to an improvement of the system for adjusting the chamfering amount of an object in the portable chamfering machine.

2. Description of the Related Art

In the case of the conventional chamfering machine intended to chamfer the corner of an object by a rotating cutter which has cutting blades round the outer circumference, the machine body having the rotating cutter at the front end thereof is provided with a slide guide which has guide planes perpendicular to each other and slidable along the corner of the object, and the cutting blades of the rotating cutter are slanted and projected into a space formed between the guide planes.

The amount of an object chamfered by this chamfering machine is determined by to what extent the cutting blades are projected into the space between the guide planes. As disclosed in the preliminarily opened Japanese Utility Model Application, Sho 62-100814, for example, the system for adjusting the cutting blades projected into the space comprises a boss arranged on the body of the chamfering machine and eccentric to the axial center of the rotating cutter, and the slide guide fitted into the eccentric boss at the base end thereof, wherein the chamfered amount of an object is set by the angle of the slide guide swung relative to the eccentric boss.

In the case of this adjusting system, however, the machine becomes complicated in construction because the eccentric boss must be arranged between the slide guide and the machine body. In addition, comparatively high processing accuracy is needed to make the eccentric boss because any error in processing the eccentric boss influences directly the relation between the angle of the slide guide swung relative to the eccentric boss and the chamfered amount of an object.

In order to solve this problem, the pending Japanese Application (Japanese Utility Model Application Sho 62-172167 filed by the Assignee of the present invention on Nov. 11, 1987) has proposed a system enabling the chamfered amount of an object to be adjusted in such a way that the slide guide is swingably pivoted directly on the underside of the body from which the rotating cutter is projected, slanting relative to the underside, and that the cutting blades are projected into the space between the guide planes in proportion to the angle of the slide guide swung round its pivoted point.

Further studying the proposal made by Japanese Utility Model Application Sho 62-172167, the inventor of the present invention has found that when the simple flat headed screw or bolt is used as a stud for swingably pivoting the slide guide on the underside of the machine body from which the rotatinq cutter is projected with its axial line slanted relative to the underside of the machine body, it takes a long time to adjust the chamfering amount of an object, because the stud or screw must be loosened and then tightened again every time when the chamfering amount of the object is adjusted by swinging the slide guide round the stud.

SUMMARY OF THE INVENTION

The present invention is intended to eliminate the above-mentioned drawbacks and the object of the present invention is therefore to provide a chamfering machine simple in construction and capable of adjusting the chamfered amount of an object easily.

The object of the present invention can be achieved by a machine for chamfering the corner of an object comprising a machine body having an underside; a rotating cutter arranged in the body and having cutting blades around the outer circumference of a portion of the rotating cutter which is projected from and slanted relative to the underside; a slide guide for slidably supporting the underside of the machine body and having guide planes perpendicular to each other and slidable along the corner of the object and also having a space formed between the planes and into which at least a part of the cutting blades of the rotating cutter is projected; a fixing means for connecting the machine body and the slide guide releasable from each other to adjust the cutting blades projected into the space; and a stud means having a first end fixed to one of the machine body and the slide guide at a position separated from the rotating cutter and serving to make the machine body and the slide guide swingable to each other when they are left released from each other by the fixing means.

When the fixing means is under release, the machine body and the slide guide become swingable round the stud means, keeping the first end of the stud means fully fixed to one of the machine body and the slide guide. The cutting blades of the rotating cutter are thus projected into the space between the guide planes by a distance which is proportional to the angle of the slide guide swung relative to the machine body, thereby enabling the chamfered amount of an object to be set. This chamfered amount of the object can be held by fixing the slide guide to the underside of the machine body.

Therefore, the present invention makes it unnecessary to arrange a specific member such as the eccentric boss between the machine body and the slide guide. The system for adjusting the chamfered amount of an object can be thus made simple in construction and the number of parts used can be reduced.

Further, that portion of a stepped through-hole in which a barrel of the stud means is housed is made a little shorter than the barrel in the axial direction of the through-hole. This makes it unnecessary to loosen the stud means but the chamfered amount of an object can be easily and quickly adjusted only by the operation of the fixing means.

The relation between the angle of the slide guide swung and the chamfered amount of an object depends only upon the position of pivot where the slide guide is pivoted on the underside of the machine body. Any error is hardly caused in the process of positioning this pivot point on the flat surfaces and the manufacture of the chamfering machine provided with this adjusting system can be made easier as compared with the case of using the eccentric boss. Further, the angle of the slide guide swung and the chamfered amount of an object have a proportional relation. Therefore, graduations for representing the chamfered amounts of objects can be easily formed at a same interval.

DETAILED DESCRIPTION OF THE PREFERRED EMBODIMENT

Figure 1:
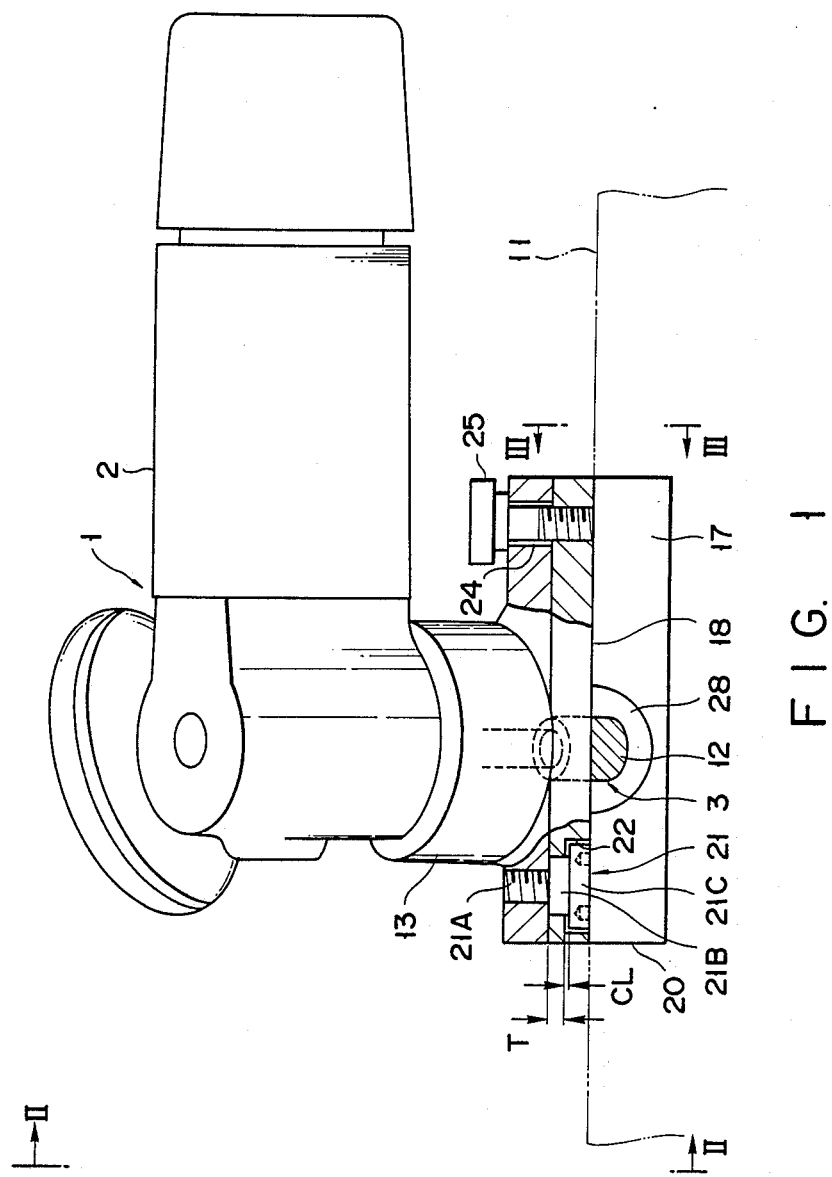
FIG. 1 is a front view showing an example of the chamfering machine according to the present invention.
Figure 2:
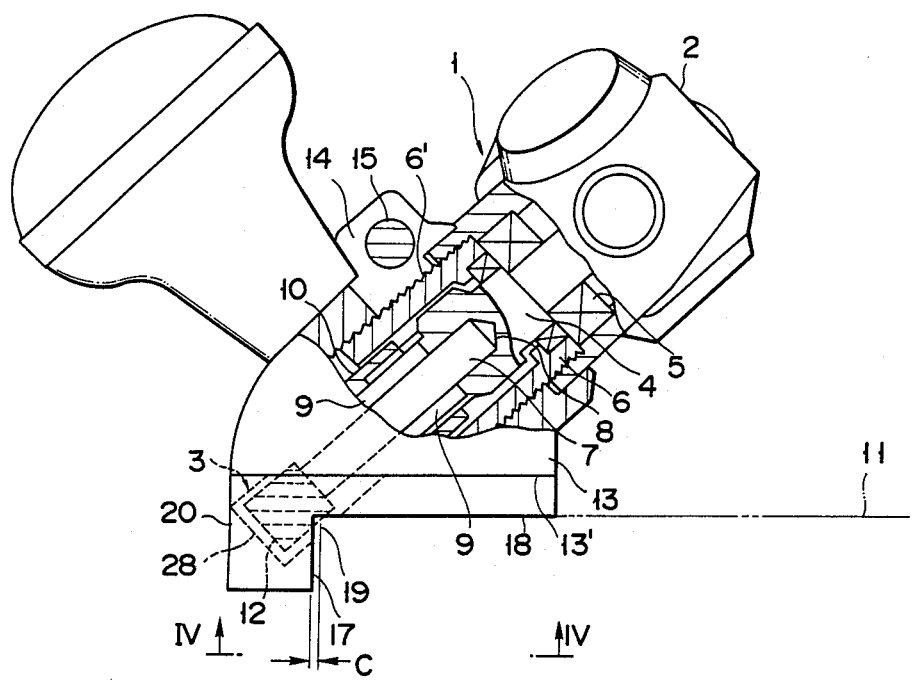
FIG. 2 is a side view showing the chamfering machine partly cut away and viewed from a line II—II in FIG. 1 in a direction shown by arrows.

In FIG. 1, reference numeral 2 represents a handle section in which a driving source such as the electric or air motor and a speed change gear system are housed. Spindle housing 6 provided with spindle 4 for supporting rotating cutter 3 and bearing means 5 for spindle 4 is connected integral to handle section 3 in a generally L-shape. As shown in FIG. 2, rotating cutter 3 is attached to shaft 7 and center hole 8 into which shaft 7 is fitted is formed in the front end portion of spindle 4. Center hole 8 is provided with plural split grooves 9 formed in the radial direction of center hole 8 to make the front end of spindle 4 flexible. Chuck ring 10 like the cap nut is screwed onto spindle 4 to hold and fix the front end portion of spindle 4 integral to shaft 7.

It is well known that rotating cutter 3 is provided on its outer circumference with a plurality of cutting blades for chamfering the corner of object 11 to be processed.

Male thread 6' having a small pitch is formed on the outer circumference of spindle housing 6. The boss section of guide base 13 is screwed onto male thread 6' and bolt 15 which is passed through split block 14 on the boss section of guide base 13 is fastened by a nut, so that guide base 13 can be connected integral to spindle housing 6 to form chamfering machine body 1 together with handle section 2. The chamfering machine of the present invention is set to have a chamfering angle of 45°. When the boss section of guide base 13 is therefore screwed onto spindle housing 6, it is tilted relative to underside 13' of guide base 13 at 45°, and cutting blades 12 of rotating cutter 3 are projected from underside 13' of guide base 13 with the boss section tilted relative to underside 13' at 45°.

When spindle housing 6 is turned together with handle section 2 relative to guide base 13, rotating cutter 3 is moved in the axial direction, depending upon the relation between the number of turns of spindle housing 6 or handle section 2 and the pitch of thread 6', so that the amount of projection of rotating cutter 3 which is projected from underside 13' of guide base 13 can be adjusted. Cutting blades 12 can be thus contacted with the corner of object 11 at all of their blade portions in the axial direction of rotating cutter 3. The extent to which spindle housing 6 is screwed into guide base 13 can be freely changed by loosening and turning bolt 15.

Slide guide 20 is pivoted upon underside 13' of guide base 13 to swing round stud 21, said slide guide 20 having guide planes 17 and 18 perpendicular to each other to contact with the corner of object 11 and letting cutting blades 12 of rotating cutter 3 be slanted at 45° and projected into angle or space 19 formed between guide planes 17 and 18. Stud 21 comprises screw 21A screwed into and fixed to the underside of guide base 13, barrel 21B and stopper head 21C which are made integral to one another and whose diameters becomes larger as it comes nearer the stopper head. Stepped through-hole 22 shaped to loosely receive barrel 21B and stopper head 21C therein is formed in the underside of slide guide 20 and length T of that portion of through-hole 22 which receive barrel 21B is made a little shorter than that of barrel 21B and when the top of slide guide 20 is closely contacted with the underside of guide base 13, clearance CL is formed between the top of stopper head 21C and the ceiling of that portion of through-hole 22 which houses stopper head 21C. Slide guide 20 is thus made swingable keeping screw 21A of stud 21 fully fixed to guide base 13.

Stud 21 round which slide guide 20 is swung is located at a position relatively remote from the axial center of rotating cutter 3 and when slide guide 20 is swung round this pivot point, cutting blades 12 of rotating cutter 3 are projected into space 19 between guide planes 17 and 18 only by a distance proportional to the angle at which slide guide 20 is swung round the pivot point. This distance C denotes the amount of object 11 which is chamfered by cutting blades 12 of rotating cutter 3.

Figure 3:
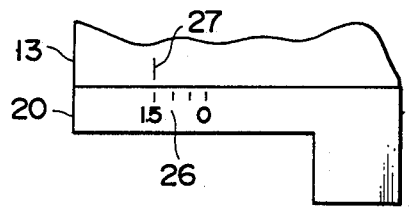
FIG. 3 is a side view showing a part of machine viewed from a line III—III in FIG. 1 in a direction shown by arrows.
Figure 4:
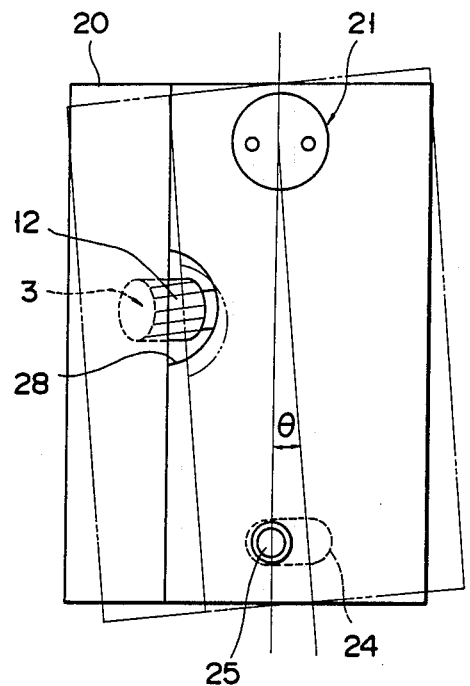
FIG. 4 is a view showing a part of the machine bottom viewed from a line IV—IV in FIG. 2 in a direction shown by arrows.

Slot 24 formed along a circle which is drawn round stud 21 is positioned opposite to stud 21 at guide base 13, sandwiching the axial center of rotating cutter 3 between stud 21 and slot 24. Stopper screw 25 is screwed into slide guide 20 after being passed through slot 24. Slide guide 20 is allowed to swing relative to guide base 13 only at an angle of $\theta$ which is defined by the length of arched slot 24. As shown in FIG. 3, for example, the dimension of slot 24 can be determined in such a way that extent C of projection of cutting blades 12 is set 1.5 mm when the right end of slot 24 is struck against stopper screw 25 and that it becomes 0 mm when the left end of slot 24 is struck against stopper screw 25. Graduations 26 for representing chamfered amounts of objects to be processed are engraved on a side of slide guide 20 and reference line 27 is also engraved on a side of guide base 13 on slide guide 20.

The chamfered amount of an object which has been set by swinging slide guide 20 relative to guide base 13 in the range of angle $\theta$ can be held by tightening fixing screw 25.

Slide guide 20 has a hole 28 for receiving cutting blades 12 and when it is swung relative to guide base 13 in the range of angle $\theta$, hole 28 has such a size that allows cutting blades 12 to be left not contacted with it.

Stopper screw 25 is loosened to make slide guide 20 swingable round stud 21 in relation to guide base 13. Reference line 27 is aligned with that of graduations 26 which represents desirable chamfered amount C of an object, and stopper screw 25 is then tightened to fix slide guide 20 to guide base 13. Length T of that portion of through-hole 22 in slide guide 20 which houses barrel 21B of stud 21 is made a little shorter than that of barrel 21B and this makes it quite unnecessary to loosen stud 21, thereby enabling the chamfered amount of an object to be adjusted only by the operation of stopper screw 25.

After the chamfered amount of an object is set in this manner, slide guide 20 is mounted on and moved along the corner of object 11, driving rotating cutter 3. Cutting blades 12 of rotating cutter 3 are projected into space 19 between planes 17 and 18 of slide guide 20 by a predetermined distance to chamfer the corner of object 11.

It should be understood that the present invention is not limited to the above-described embodiment but that various changes and modifications can be made without departing the spirit and scope of the present invention.

Slide guide 20, for example, may be fixed to guide base 13 in such a way that arched slot 24 is formed in slide guide 20 and that stopper screw 25 is inserted into slot 24 from the bottom side of slide guide 20. The head of stopper screw 25 must be embedded in guide plane 22 in this case, keeping slide guide 20 fixed to guide base 13. The fixing means for positioning and fixing slide guide on and to underside 13' of guide base 13 and keeping certain the distance of cutting blades 12 projected into the space between planes 17 and 18 of slide guide 20 is not limited to the combination of the slot and the stopper screw.

The system of pivoting slide guide 20 and guide base 13 by means of stud 21 may be arranged in such a way that screw 21A of stud 21 is screwed into slide guide 20 after passing through guide base 13. It is not needed in this case that stopper head 21C is embedded in guide base 13. Screw 21A of stud 21 may be of the closely fitting type or rivet type.

It has been arranged in the case of the above-described embodiment of the present invention that handle section 2 and guide base 13 are connected integral to each other by means of spindle housing 6 which has thread 6' on the outer circumference thereof and that when spindle housing 6 is turned together with handle section 2 relative to guide base 13, rotating cutter 3 is moved to change that portion of cutting blades 12, which is contacted with the corner of object 11 or projected into space 19 between guide planes 17 and 18 of slide guide 20, in the axial direction of cutter 3. However, the construction of the machine body on which slide guide 20 is pivoted is not limited to the above.

What is claimed is:

1. A machine for chamfering the corner of an object comprising:
   a machine body having an underside;
   a rotating cutter arranged in the machine body, which projects out from said underside, tilted with respect thereto;
   a slide guide, rotatably supported with respect to the underside for swinging movement about a first axis located remote from said rotating cutter, having a side adjacent to the machine body and an opposite other side, and having guide planes perpendicular to each other and slidable along the corner of the object and also having a space between the planes into which at least a part of the cutting blades of the rotating cutter is projected;
   a slot formed in said machine body; and
   a stopper screw screwed into said slide guide through the slot;
   said slide guide further comprising a stepped through-hole, located at said first axis and having a small diameter portion on the side adjacent to the machine body and a large diameter portion on the other side, and a stud projected into said through-hole for rotating said machine body and slide guide relative to each other when said screw is loosened, said stud having a screw portion fixed on said machine body side, a barrel portion arranged in the small-diameter portion of said through-hole, a length of said barrel portion being longer than the depth of said small diameter portion, and a head portion received in said large-diameter portion of said stepped through-hole.

2. The machine according to claim 1 wherein the small-diameter portion of the through-hole has a diameter substantially same as that of the barrel.

3. The machine according to claim 2 wherein the length of said stepped through-hole is made equal at least to those of the barrel and head of the stud in its axial direction.

4. The machine according to claim 3 wherein the machine body includes a spindle housing having a male thread on its outer circumference and serving to detachably support the rotating cutter, a handle section and a guide base having screw holes which are concentric with each other and into which the spindle housing is screwed, and being connected integral to each other by the spindle housing and wherein the rotating cutter projected from the underside into the space can be adjusted by turning the spindle housing relative to the handle section and the guide base.

5. The machine according to claim 4 wherein the rotating cutter is projected from the underside, slanting at 45° relative to the underside.

6. The machine according to claim 5 wherein the said slot is formed along a circle which is drawn round the stud.

7. The machine according to claim 6 wherein the slide guide has a hole having such a size that enables the rotating cutter to be left untouched with the slide guide when the stopper screw is moved in the slot.

8. The machine according to claim 7 wherein one of the guide base and the slide guide has a reference line and the other of them has graduations which enables the distance of their relative movement to be measured on the basis of the reference line.

* * * * *